(12) United States Patent
Saori et al.

(10) Patent No.: US 8,416,508 B2
(45) Date of Patent: Apr. 9, 2013

(54) IMAGING DEVICE

(75) Inventors: Masakazu Saori, Saitama (JP);
Koichiro Hayakawa, Saitama (JP)

(73) Assignee: Hoya Corporation, Tokyo (JP)

( * ) Notice: Subject to any disclaimer, the term of this patent is extended or adjusted under 35 U.S.C. 154(b) by 23 days.

(21) Appl. No.: 13/247,128

(22) Filed: Sep. 28, 2011

(65) Prior Publication Data
US 2012/0081797 A1 Apr. 5, 2012

(30) Foreign Application Priority Data

Sep. 30, 2010 (JP) ................................. 2010-220914
Sep. 26, 2011 (JP) ................................. 2011-208760

(51) Int. Cl.
*G02B 17/00* (2006.01)
*G02B 9/00* (2006.01)
*G02B 27/02* (2006.01)

(52) U.S. Cl. ........ 359/726; 359/737; 359/739; 359/740; 359/798; 359/800; 359/809

(58) Field of Classification Search .................. 359/726, 359/737–740, 798, 800, 809
See application file for complete search history.

(56) References Cited

U.S. PATENT DOCUMENTS

| | | | | |
|---|---|---|---|---|
| 6,829,011 B1 * | 12/2004 | Higuchi et al. | ............... | 348/340 |
| 6,850,279 B1 * | 2/2005 | Scherling | ...................... | 348/335 |
| 7,085,073 B1 * | 8/2006 | Han et al. | ...................... | 359/698 |
| 7,605,989 B1 * | 10/2009 | Sohn et al. | ..................... | 359/726 |
| 2004/0246362 A1 | 12/2004 | Konno | | |
| 2006/0092524 A1 * | 5/2006 | Konno | ......................... | 359/678 |
| 2008/0291543 A1 | 11/2008 | Nomura et al. | | |

FOREIGN PATENT DOCUMENTS

| | | |
|---|---|---|
| JP | 2004-334070 | 11/2004 |
| JP | 2008-242446 | 10/2008 |

OTHER PUBLICATIONS

U.S. Appl. No. 12/036,459 to Hiroshi Nomura et al., filed Feb. 25, 2008.

* cited by examiner

*Primary Examiner* — Evelyn A. Lester

(74) *Attorney, Agent, or Firm* — Greenblum & Bernstein P.L.C.

(57) ABSTRACT

An imaging device is provided with an imaging sensor having a rectangular imaging surface, an image-forming optical system for forming an image onto the imaging surface, and a prism disposed between the image-forming optical system and the imaging sensor for bending an optical path. A mask, having a rectangular opening, limits light that is to be incident on the imaging sensor. The aspect ratio (long side/short side) of the mask rectangular opening of the mask is larger than that of the rectangular imaging surface, and the peripheral light quantity difference between the short and long sides on the rectangular imaging surface is smaller than in the case of these two aspect ratios being equal to each other.

8 Claims, 10 Drawing Sheets

Fig. 7
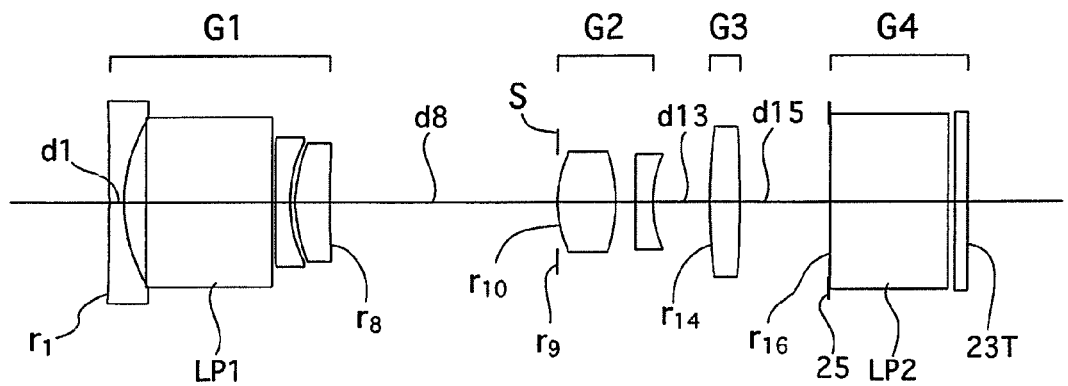
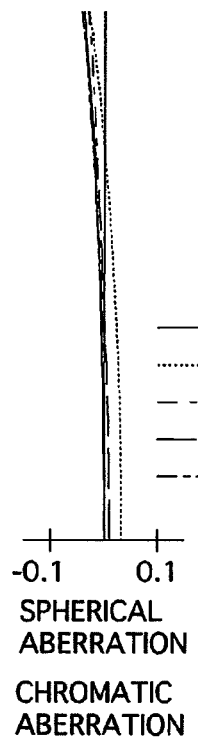
Fig. 8A
FNO.=1:3.6
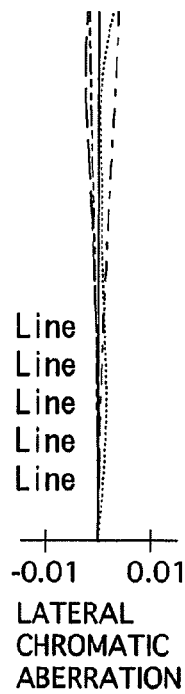
Fig. 8B
Y=2.9
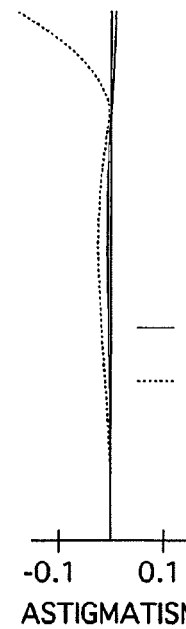
Fig. 8C
Y=2.9
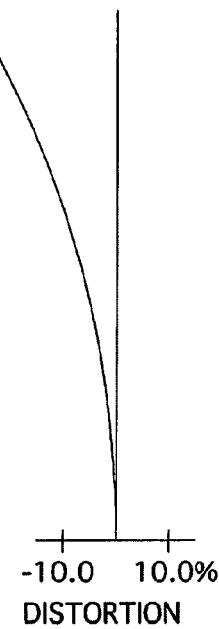
Fig. 8D
Y=2.9

FNO.=1:6.2

-0.1   0.1
SPHERICAL
ABERRATION
CHROMATIC
ABERRATION

——— d Line
·········· g Line
— — C Line
— — F Line
— ·· — e Line

Y=2.9

-0.01  0.01
LATERAL
CHROMATIC
ABERRATION

Y=2.9

-0.1   0.1
ASTIGMATISM

——— S
·········· M

Y=2.9

-10.0  10.0%
DISTORTION

Fig. 11
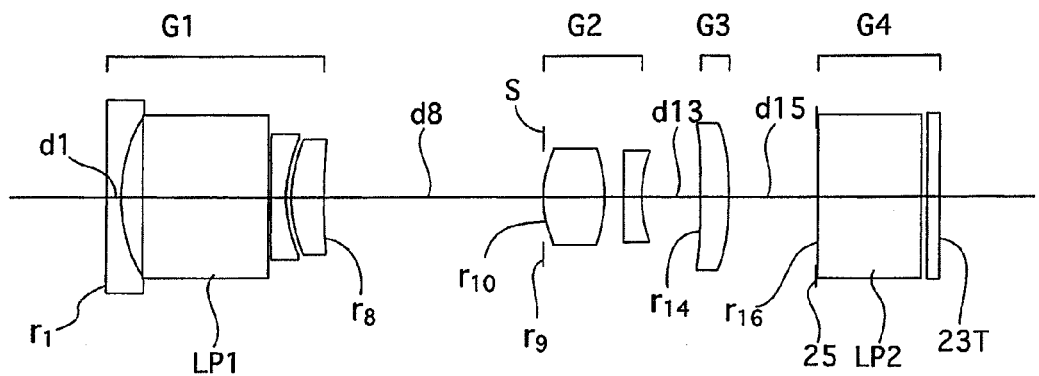
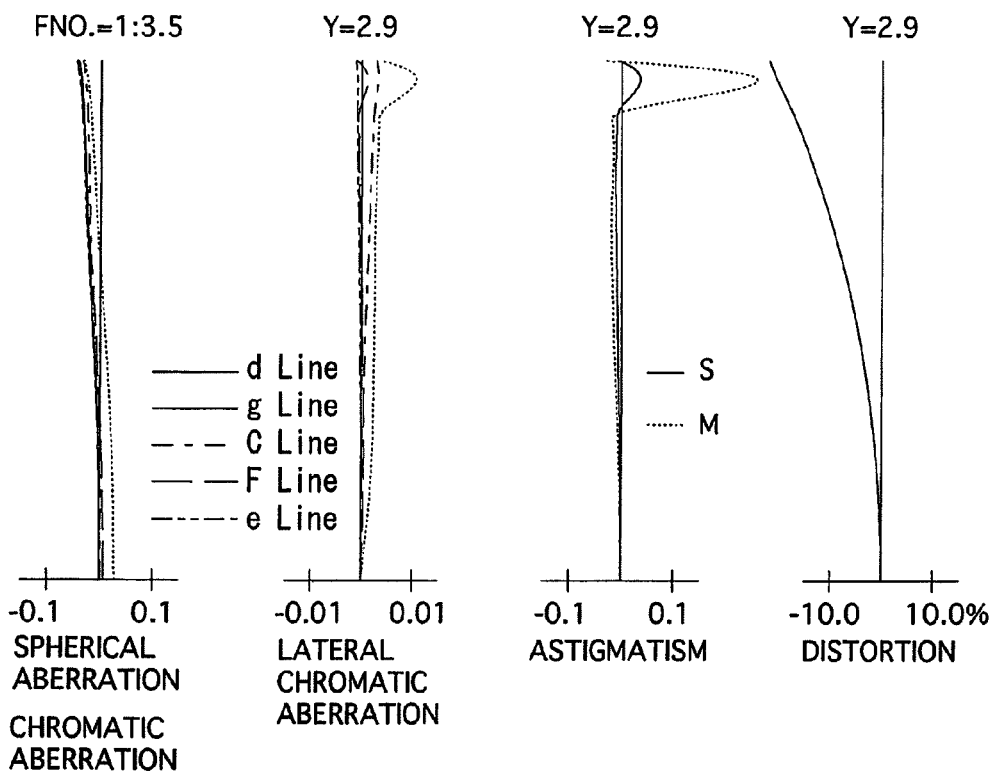
Fig. 12A　Fig. 12B　Fig. 12C　Fig. 12D

Fig. 15
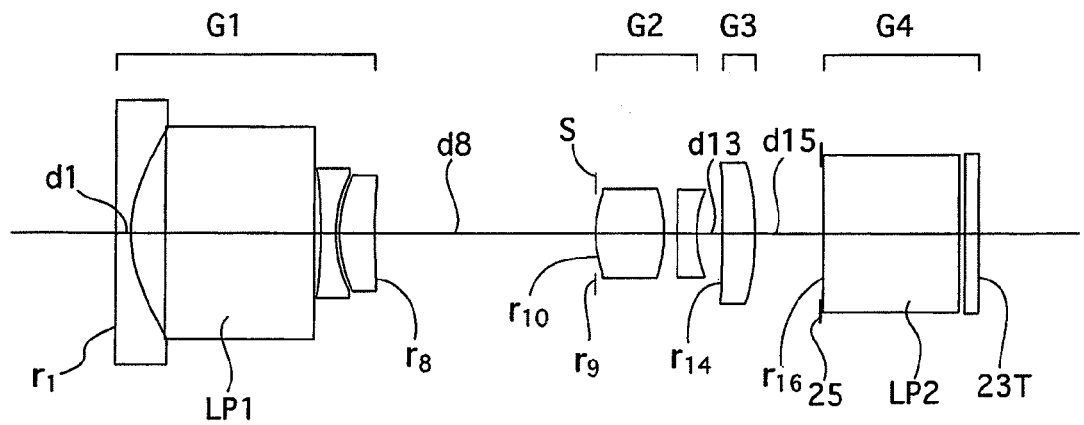
Fig. 16A  Fig. 16B  Fig. 16C  Fig. 16D
FNO.=1:3.5  Y=2.6  Y=2.6  Y=2.6
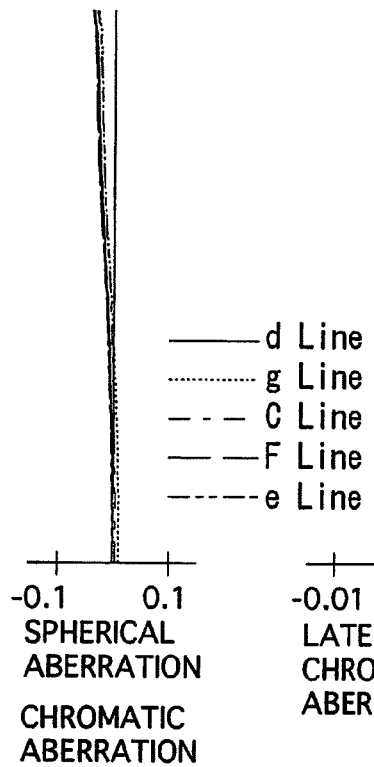
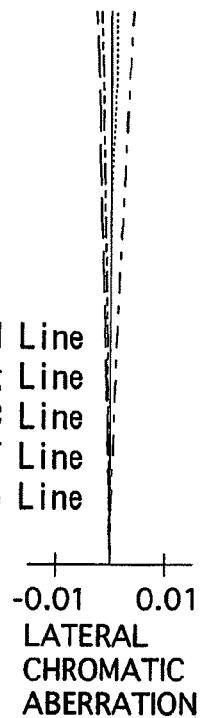
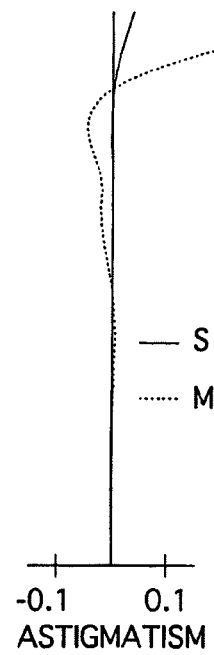
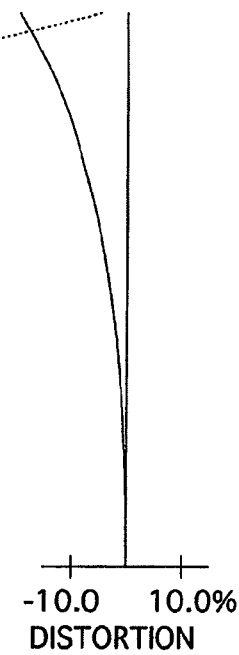
-0.1  0.1    -0.01  0.01    -0.1  0.1    -10.0  10.0%
SPHERICAL     LATERAL       ASTIGMATISM  DISTORTION
ABERRATION    CHROMATIC
              ABERRATION
CHROMATIC
ABERRATION Fig. 17
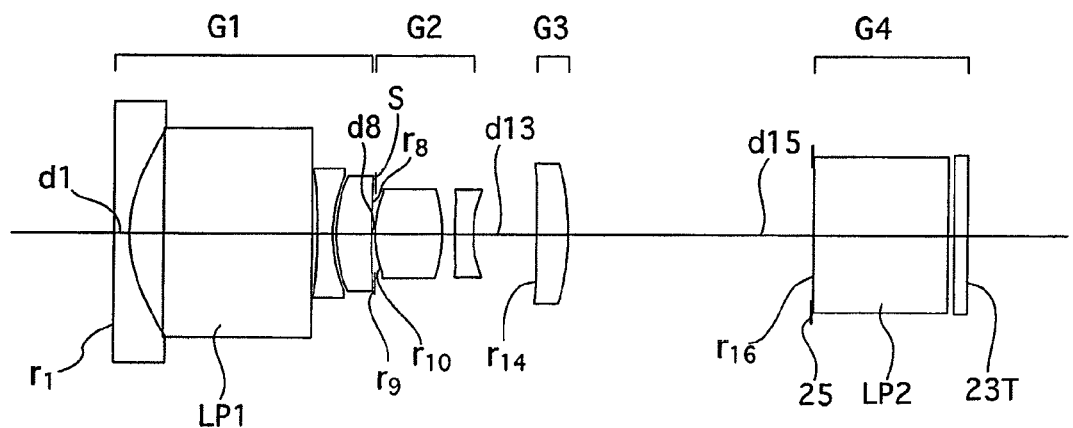
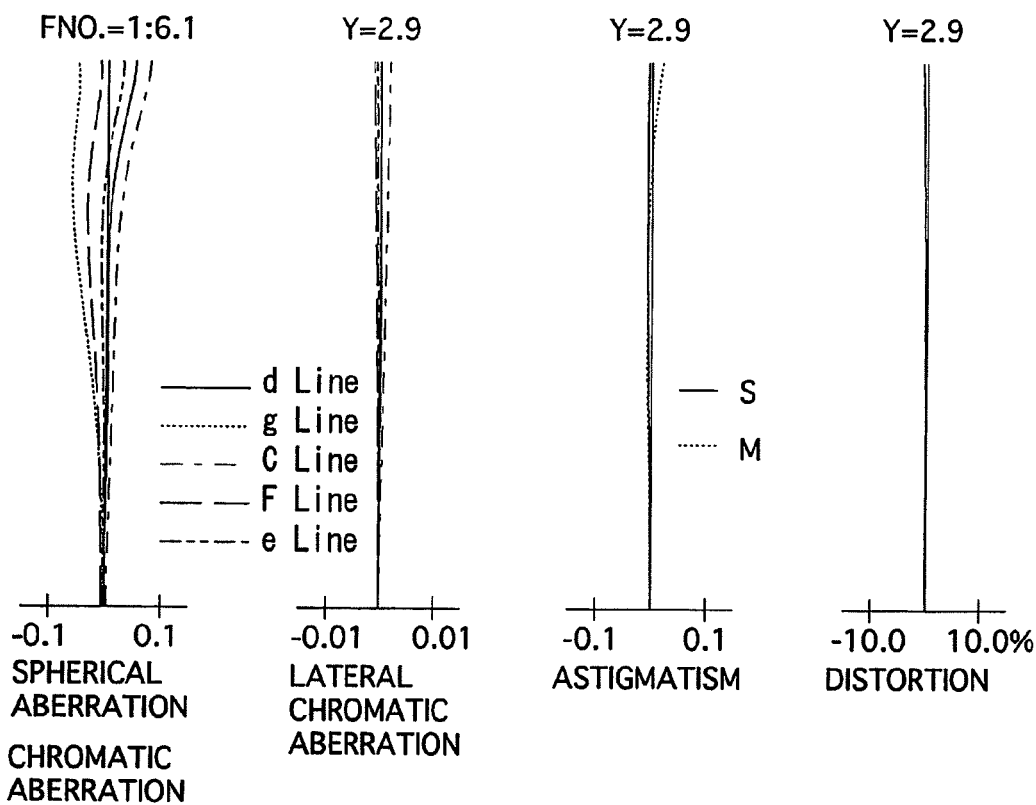
Fig. 18A  Fig. 18B  Fig. 18C  Fig. 18D

IMAGING DEVICE

BACKGROUND OF THE INVENTION

1. Field of the Invention

The present invention relates to an imaging device, in which an image formed by an image-forming optical system is bent by prism to be incident on an imaging sensor.

2. Description of the Related Art

When pursuing further downsizing/miniaturization of imaging devices, incorporated in mobile electronic devices such as mobile phones, a further reduction in the diameter of each optical element is required. However, a smaller diameter optical element causes insufficient light quantity in the peripheral (marginal) area of imaging surface. Since the imaging surface has a rectangular shape (i.e., not a square shape), the peripheral light quantity along the long sides (the peripheral light quantity in the direction parallel to the long sides of imaging surface, i.e., the portions in the vicinity of the short sides of imaging surface) is considerably smaller than the peripheral light quantity along the short sides (the peripheral light quantity in the direction parallel to the short sides of imaging surface, i.e., the portions in the vicinity of the long sides of imaging surface). In particular, there are some imaging devices in which a prism (bending optical system) is provided at the front of an imaging sensor in order to satisfy demands for slimming down the size of the body in which the imaging device is installed. In such a structure, the imaging device would face a problem of being unable to enlarge the lens diameter at the front of the prism, which worsens the peripheral light quantity along the long sides of the imaging surface. Therefore, in order to reduce the difference between peripheral light quantity at the short sides and the peripheral light quantity at the long sides of a rectangular shaped imaging sensor, much effort has been made to increase the peripheral light quantity along the long sides, in other words, to increase the light quantity at the whole peripheral portions (regardless of short sides and long sides).

An example of the related art is disclosed in Japanese Unexamined Patent Application No. 2008-242446.

The present invention provides an imaging device configured of an imaging sensor having a rectangular imaging surface, an image-forming optical system for forming an image on the imaging surface, and a prism positioned between the image-forming optical system and the imaging sensor to bend the optical path, in which the peripheral light quantity difference between the short sides and the long sides on the rectangular imaging surface is reduced.

SUMMARY OF THE INVENTION

Although the problem to be solved lies in how to increase the peripheral light quantity along the long sides of an imaging surface, the present invention solves this problem based on the reversal idea by which the peripheral light quantity along the short sides is reduced so that the peripheral light quantity difference between the short sides and the long sides can be reduced.

According to an aspect of the present invention, an imaging device is provided, including an imaging sensor having a rectangular imaging surface, an image-forming optical system which forms an object image onto the rectangular imaging surface, a prism disposed between the image-forming optical system and the imaging sensor, the prism bending the optical path of the image-forming optical system, and a mask provided with a rectangular opening which limits light that is to be incident on the imaging sensor. The aspect ratio of the rectangular opening of the mask is larger than the aspect ratio of the rectangular imaging surface of the imaging sensor. The mask is disposed at a position at which a peripheral light quantity difference between the short side and the long side of the rectangular imaging surface of the imaging sensor is smaller than in a case where the aspect ratio of the rectangular opening of the mask is equal to the aspect ratio of the rectangular imaging surface of the imaging sensor.

It is desirable for the following condition (1) to be satisfied:

(1) $0.5 < B/A < 0.9$, wherein A designates the aspect ratio of the rectangular opening of the mask, and B designates the aspect ratio of the rectangular imaging surface of the imaging sensor.

It is desirable for the mask to be disposed at a position which is closer to the object side than a position of the prism.

It is desirable for the following condition (2) to be satisfied:

(2) $1.0 < Lm/V < 3.0$, wherein Lm designates the distance from the imaging surface of the imaging sensor to the opening of the mask, and V designates the length of the short side of the imaging surface of the imaging sensor.

It is desirable for the image-forming optical system to include a zoom optical system, and for the following condition (3) to be satisfied:

(3) $Lm \cdot |(1/DexpW) - (1/DexpT)| < 0.3$, wherein DexpW designates the exit pupil diameter at the shortest focal length extremity of the zoom optical system, and DexpT designates the exit pupil diameter at the longest focal length extremity of the zoom optical system.

It is desirable for the following condition (4) to be satisfied:

(4) $0.6 < Y/V < 1.0$, wherein Y designates the length of the short side of the opening of the mask, and V designates the length of the short side of the imaging surface of the imaging sensor.

According to the present invention, the imaging device is provided with the imaging sensor having a rectangular imaging surface, the image-forming optical system for forming an image on the imaging surface, the prism positioned between the image-forming optical system and the imaging sensor to bend the optical path, and the mask having a rectangular opening for limiting light incident on the imaging sensor. This imaging device is capable of reducing the peripheral light quantity difference between the short sides and the long sides of the rectangular imaging surface.

According to an aspect of the present invention, the image-forming optical system includes a negative first lens group having an incident-side prism, a positive second lens group and a positive third lens group, arranged in that order from the object side. During the zooming operation, the first lens group is stationary, and the second and third lens groups move in the optical axis direction.

According to an aspect of the present invention, the mask is preferably provided on an incident surface of the prism which is disposed between the image-forming optical system and the imaging sensor.

The present disclosure relates to subject matter contained in Japanese Patent Application Nos. 2010-220914 (filed on Sep. 30, 2010) and 2011-208760 (filed on Sep. 26, 2011), which are expressly incorporated herein by reference in their entireties.

BRIEF DESCRIPTION OF THE DRAWINGS

The invention will be described below in detail with reference to the accompanying drawings, in which:

FIG. 7 shows a lens arrangement of a first numerical embodiment of an imaging device, according to the present invention, at the short focal length extremity;

FIGS. 8A, 8B, 8C and 8D show various aberrations that occurred in the lens arrangement shown in FIG. 7;

FIG. 11 shows a lens arrangement of a second numerical embodiment of an imaging device, according to the present invention, at the short focal length extremity;

FIGS. 12A, 12B, 12C and 12D show various aberrations that occurred in the lens arrangement shown in FIG. 11;

FIG. 15 shows a lens arrangement of a third numerical embodiment of an imaging device, according to the present invention, at the short focal length extremity;

FIGS. 16A, 16B, 16C and 16D show various aberrations that occurred in the lens arrangement shown in FIG. 15;

FIG. 17 shows a lens arrangement of the third numerical embodiment of the imaging device, according to the present invention, at the long focal length extremity; and FIGS. 18A, 18B, 18C and 18D show various aberrations that occurred in the lens arrangement shown in FIG. 17.

DESCRIPTION OF THE EMBODIMENTS

Figure 1:
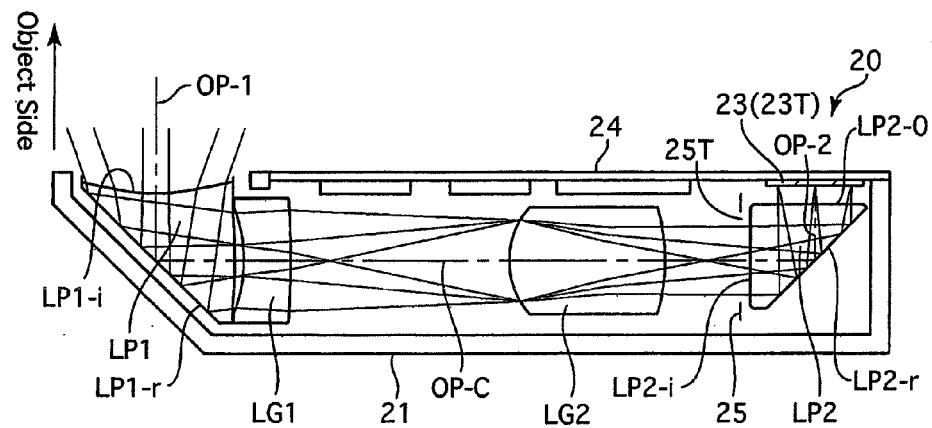
FIG. 1 is a sectional view of an imaging device according to an embodiment of the present invention, taken along the optical axis.

An embodiment of the present invention will now be described with reference to the drawings. FIG. 1 is a sectional view of an imaging device (imaging unit) 20 according to the present invention. The imaging device 20 has a housing 21 supporting an imaging optical system. This optical system includes a first prism (incident-side prism/incident-side optical element) LP1, a first magnification lens group LG1 having a negative power, a second magnification lens group LG2 having a positive power, and a second prism (exit-side prism) LP2. The optical system incorporated in the imaging device 20 is a zoom optical system, which varies the focal length by moving the movable first magnification lens group LG1 and the second magnification lens group LG2 in the optical axis direction.

The optical system of this imaging device will now be explained. Object-emanated light is incident on an incident surface LP1-i of the first prism LP1. The first prism LP1 reflects the incident light by a reflection surface LP1-r at a substantially right angle, and this reflected light travels through the first magnification lens group LG1 and the second magnification lens group LG2, along an intermediate optical axis OP-C perpendicular to an incident optical axis OP-1, to be incident on an incident optical surface LP2-i of the second prism LP2. The second prism LP2 reflects the incident light by a reflection surface LP2-r at a substantially right angle, and the light thus reflected exits from an exit surface LP2-o along an exit optical axis OP-2 parallel to the incident optical axis OP-1. According to this configuration, the incident optical axis OP-1, the intermediate optical axis OP-C and the exit optical axis OP-2 constitute a single optical system bent in a substantially U-shape. The positions of the incident optical axis OP-1, the intermediate optical axis OP-C and the exit optical axis OP-o are all located on a common plane defined by the page of FIG. 1.

Figure 2:
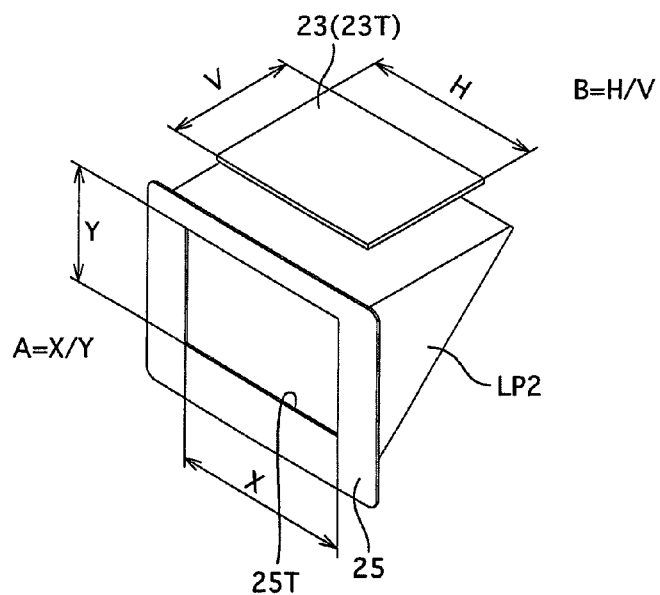
FIG. 2 is an extracted perspective view of the imaging device of FIG. 1, only showing a mask, a prism and an imaging sensor.

An imaging sensor 23 is provided and is positioned on the exit optical axis OP-2, so that the imaging surface of the imaging sensor 23 is perpendicular to the exit axis OP-2 (see FIG. 1). The imaging sensor 23 is provided on the inner surface of a cover board 24 which covers the upper portion of the housing 21 as shown in FIG. 1. A mask 25 for limiting light incident on the imaging sensor 23 is provided at the front of the incident surface LP2-i of the second prism LP2 (on the object side). FIG. 2 is an extracted perspective view, only showing the second prism LP2, the imaging sensor 23 (only showing an imaging surface 23T), and the mask 25. The imaging surface 23T of the imaging sensor 23 is rectangular in shape, and the mask 25 has a rectangular opening 25T formed at an aspect ratio different from that of the imaging surface 23T.

The aspect ratio A (ratio of the length of the long side to the length of the short side) of the opening 25T of the mask 25 is defined by the following formula: A=X/Y, wherein the length of the long side is X and the length of the short side is Y. Similarly, the aspect ratio B of the opening 23T of the imaging sensor 23 is defined by the following formula: B=H/V, wherein the length of the long side is H and the length of the short side is V.

According to the embodiment of the present invention, the aspect ratio A of the opening 25T set larger than the aspect ratio B of the imaging surface 23T (A>B) (i.e., the shape of the opening 25T is horizontally wider than that of the imaging surface 23T), and the mask 25 is placed at a position at which the peripheral light quantity difference between the short sides and the long sides of the imaging surface 23T of the imaging sensor 23 is small. If the mask 25 is placed excessively close to the imaging sensor 23, the light incident on the peripheral area in the short side direction (the portions in the vicinity of the long sides) of the imaging sensor 23 decreases excessively. On the other hand, if the mask 25 is placed excessively far away from the imaging sensor 23, light passed through the opening 25T reaches the portions in the vicinity of the long sides (of the imaging surface 23T) again, thus the effective reduction of light incident on the portions in the vicinity of the long sides cannot be accomplished.

Figure 3:
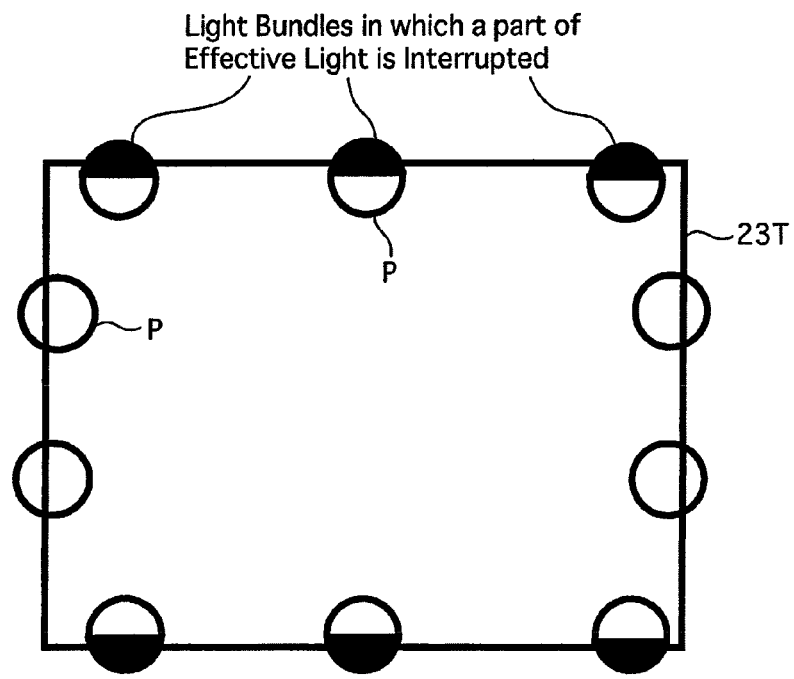
FIG. 3 is a schematic model view showing a light intercepting effect of a mask according to the present invention.
Figure 4:
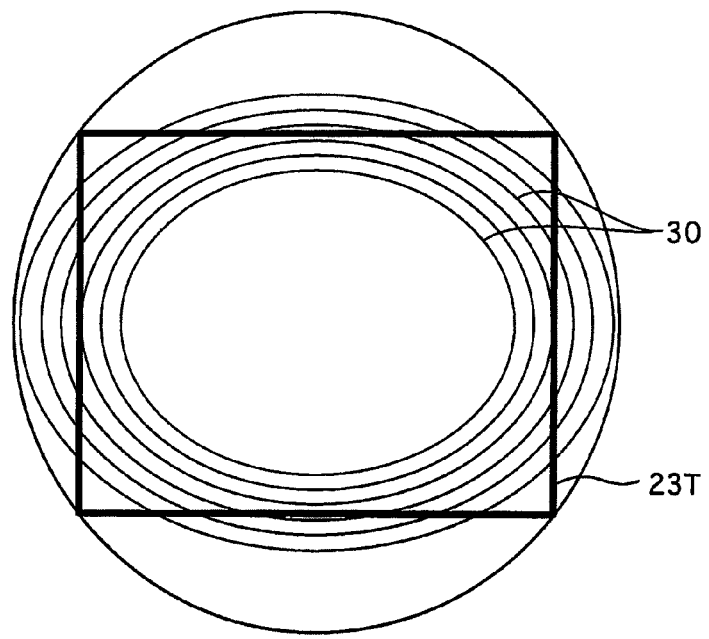
FIG. 4 is a view showing lines of equal light quantities, illustrating equal light quantity distribution both at the short sides and the long sides of an imaging surface.

FIGS. 3 through 5 show the function (effect) of reducing the peripheral light quantity difference between the short sides and the long sides of the imaging 23T, according to the present embodiment, by reducing the quantity (volume) of light that is incident on the vicinity of the short sides of the imaging 23T. As shown in FIG. 3, there are several effective light bundles P converging on portions in the vicinity of peripheral area of the imaging surface 23T. Some effective light bundles P converging on the portions in the vicinity of the long sides of the imaging surface 23T are partially intercepted (on the outer side), whereas the other effective light bundles P at the portions in the vicinity of the short side are not intercepted. The black portions in some of the effective light bundles P show the parts that do not reach the imaging surface 23T.

As discussed above, the rectangular opening 25T of the mask 25 partially (on the outer side) intercepts (shields) the light bundle converging on the portions in the vicinity of the long sides of the rectangular imaging surface 23T, whereby the light quantity (volume) at the portions in the vicinity of the long sides of the imaging surface 23T is reduced, and as a result, the peripheral light quantity difference between the short sides and the long sides is reduced (extinguished). FIG. 4 shows oval lines of equal light quantities (volumes) 30 indicated on the imaging surface 23T. As shown in FIG. 4, the shape of each line of equal light quantities (volumes) 30 on the imaging surface 23T is (can become) closer to the shape of the imaging surface 23T itself, whereby the light quantity difference between the portions in the vicinity of the long sides and the portions in the vicinity of the short sides is small. Accordingly, a user does not sense a lower light quantity in the peripheral area of the viewed image.

Figure 5A:
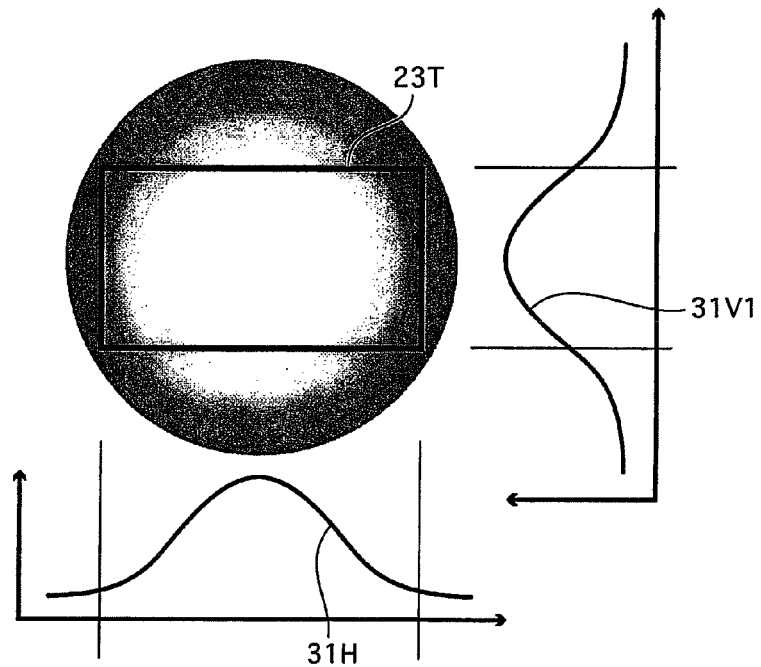
FIGS. 5A and 5B respectively show a difference in light quantity distribution at the short sides and the long sides of the imaging surface, based on different mask shapes (whether the mask is provided or not)
Figure 5B:
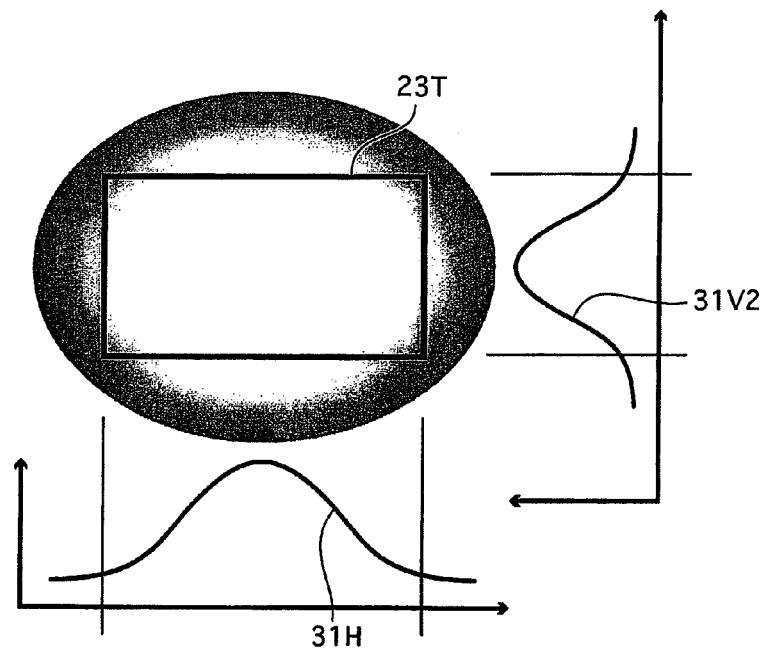

FIGS. 5A and 5B show examples of light quantity distributions, wherein FIG. 5A shows the case in which the aspect ratio of the mask opening 25T is substantially the same as the aspect ratio of the imaging surface 23T, and FIG. 5B shows the case in which the aspect ratio of the mask opening 25T is appropriately larger than the aspect ratio of the imaging surface 23T and the mask 25 is placed at an optimal position. In regard to a light quantity distribution 31H, representing the light quantity distribution parallel to the long sides of the imaging surface 23T, it should be noted that there is almost no difference between FIGS. 5A and 5B. On the other hand, in regard to light quantity distributions 31V1 and 31V2, respectively representing the light quantity distributions parallel to the short sides of the imaging surface 23T in the above two cases, the light quantity distribution 31V1 of FIG. 5A is not lowered in the vicinity of the long sides (i.e. the peripheral light quantity is still large in the vicinity of the long sides), whereas the light quantity distribution 31V2 of FIG. 5B is lowered in the vicinity of the long sides (i.e. the light quantity becomes small in the vicinity of the long sides). Accordingly, as can be clearly understood from FIG. 5B, the light quantity difference between the portions in the vicinity of the short sides and the portions in the vicinity of the long sides is small.

Condition (1) specifies a desirable range of proportion between the aspect ratio A of the opening 25T and the aspect ratio B of the imaging surface 23T:

$$0.5 < B/A < 0.9 \tag{1}$$

If the lower limit of condition (1) is exceeded, the opening 25T becomes excessively wide in the horizontal direction in comparison to the imaging surface 23T, which results in an excessive reduction of the peripheral light quantity at the short sides (peripheral light quantity in the direction parallel to the short sides) of the imaging surface 23T. Thus, a considerable peripheral light quantity difference would occur between the short sides and the long sides of the imaging surface 23T. On the other hand, if a the upper limit of condition (1) is exceeded, the peripheral light quantity at the short sides of the imaging surface 23T cannot be reduced sufficiently, which also causes a considerable peripheral light quantity difference between the short sides and the long sides of the imaging surface 23T.

Condition (2) specifies a desirable position of the mask 25 defined by the proportion between the distance from the imaging sensor 23 (Lm) to the mask 25 and the length of the short side of the imaging surface 23T of the imaging sensor 23 (V):

$$1.0 < Lm/V < 3.0 \tag{2}$$

If the lower limit of condition (2) is exceeded, the position of the mask 25 is excessively close to the imaging sensor 23, which results in excessive reduction of peripheral light quantity at the short sides due to vignetting by the mask 25. Accordingly, a considerable peripheral light quantity difference occurs between the short sides and the long sides of the imaging surface 23T. On the other hand, if the upper limit of condition (2) is exceeded, the position of the mask 25 is excessively far away from the imaging sensor 23, and the peripheral light quantity at the short sides cannot be reduced sufficiently, which also causes a considerable peripheral light quantity difference between the short sides and the long sides of the imaging surface 23T.

Condition (3) specifies the desirable exit pupil diameters (DexpW: exit pupil diameter at a shortest focal length position, DexpT: exit pupil diameter at a longest focal length position) in the case where the image-forming optical system is a zoom optical system, whereby the effect of the mask can be achieved throughout the whole zooming range:

$$Lm \cdot |(1/DexpW) - (1/DexpT)| < 0.3 \tag{3}$$

If the upper limit of condition (3) is exceeded, variation of telecentric angle during zooming becomes larger, which is undesirable due to the difference in the effect of the mask depending on the zooming range.

Condition (4) specifies a desirable range of proportion between the length of the short side of the opening 25T of the mask 25 (Y) and the length of the short side of the imaging surface 23T of the imaging sensor 23 (V):

$$0.6 < Y/V < 1.0 \tag{4}$$

If the lower limit of condition (4) is exceeded, the length of the short sides of the opening 25T becomes excessively shorter than the length of the short sides of the imaging surface 23T, which results in an excessive reduction of peripheral light quantity at the short sides of the imaging surface 23T. Accordingly, a considerable peripheral light quantity difference would occur between the short sides and the long sides of the imaging surface 23T. On the other hand, if the upper limit of condition (4) is exceeded, the length of the short sides of the opening 25T becomes excessively longer than the length of the short sides of the imaging surface 23T, thus the peripheral light quantity along the short sides of the imaging surface 23T cannot be reduced sufficiently, which also causes a considerable peripheral light quantity difference between the short sides and the long sides of the imaging surface 23T.

More preferably, the following conditional formula (4') can be satisfied:

$$0.6 < Y/V < 0.9 \tag{4'}$$

Figure 6A:
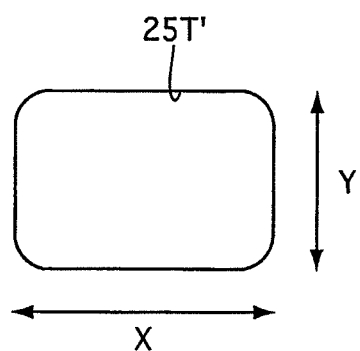
FIGS. 6A and 6B are front views showing mask shapes in modified examples.
Figure 6B:
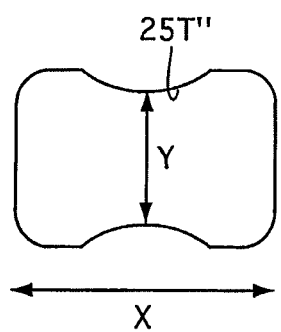

FIGS. 6A and 6B show other shape examples of the opening 25T of the mask 25. FIG. 6A is an example of a rectangular opening 25T', of which all four corners thereof are rounded (having a curvature). FIG. 6B is another example of an opening 25T" which has a bobbin shape, in which a middle section of each of the long sides is curved toward each other.

As discussed above, the present invention is clearly characterized by the relation among the opening 25T (25T', 25T") of the mask 25, the second prism LP2 and the imaging sensor 23. The other optical elements, i.e., the optical elements closer to the object side than the mask 25, are shown only for the purpose of exemplification, and are not limited to the present embodiment.

EMBODIMENTS

Specific numerical embodiments 1 through 3 will be herein discussed. In the aberration diagrams and the tables, the d-line, g-line, C-line, F-line and e-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus (distance between the surface on the image side of a cover glass that is located closest to the image side and an imaging surface 23T), r designates the radius of curvature, d designates the lens thickness or distance between lenses, N(d) designates the refractive index at the d-line, and vd designates the Abbe number with respect to the d-line. The values for the f-number, the focal length, the half angle-of-view, the image height, the backfocus and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 9:
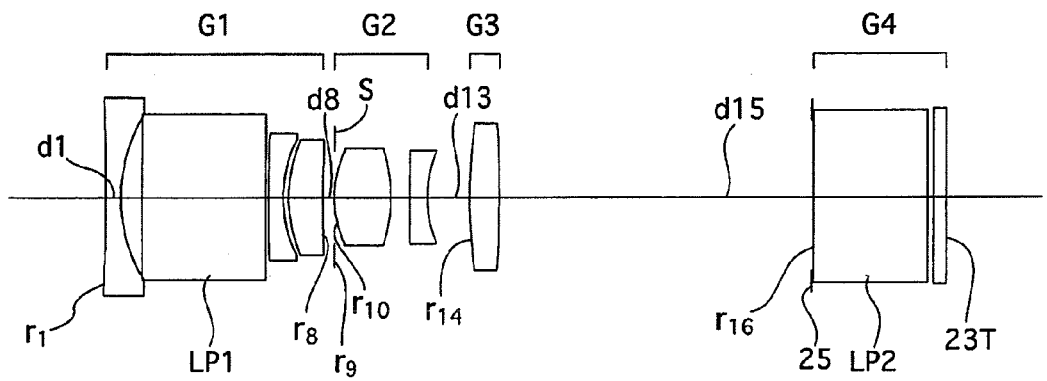
FIG. 9 shows a lens arrangement of the first numerical embodiment of the imaging device, according to the present invention, at the long focal length extremity.
Figure 10A:
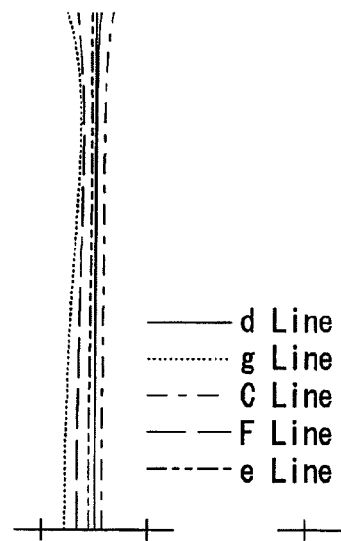
FIGS. 10A, 10B, 10C and 10D show various aberrations that occurred in the lens arrangement shown in FIG. 9.
Figure 10B:
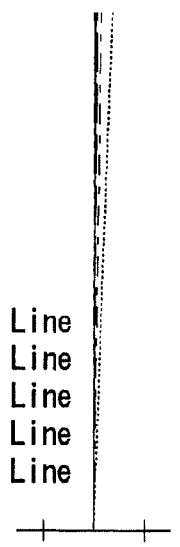
Figure 10C:
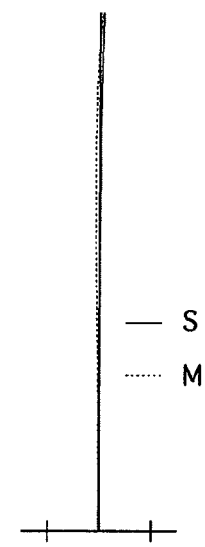
Figure 10D:
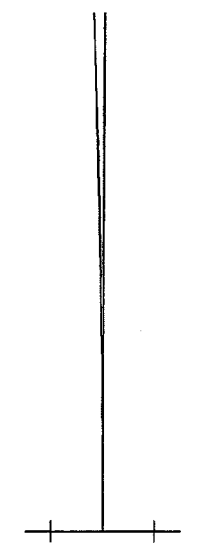

FIGS. 7 through 10D and Tables 1 through 5 show a first numerical embodiment of the imaging device (including a zoom lens system) of the present invention. FIG. 7 shows a lens arrangement of the first numerical embodiment of the imaging device at the wide-angle (short focal length) extremity when focused on an object at infinity. FIGS. 8A, 8B, 8C and 8D show various aberrations that occurred in the lens arrangement shown in FIG. 7. FIG. 9 shows a lens arrangement of the first numerical embodiment of the imaging device at the telephoto (long focal length) extremity when focused on an object at infinity. FIGS. 10A, 10B, 10C and 10D show various aberrations that occurred in the lens arrangement shown in FIG. 9;

Table 1 shows the lens surface data, Table 2 shows various lens system data, Table 3 shows the aspherical surface data, Table 4 shows lens group data and Table 5 shows data which is related to conditions of the present invention.

As shown in FIGS. 7 and 9, the imaging device of the first numerical embodiment is configured of a negative first lens group G1 having an incident side prism LP1 (surface Nos. 1 through 8), a diaphragm S (surface No. 9), a positive second lens group G2 (surface Nos. 10 through 13), a positive third lens group G3 (surface Nos. 14 and 15), and a fourth lens group G4 including a exit-side prism LP2 and a cover glass 23T of a imaging device 23 (surface Nos. 16 through 19), in that order from the object side. A mask 25 is provided on an incident surface (surface No. 16) of the exit-side prism (second prism LP2). The first to third lens groups G1 to G3 constitute an imaging-optical system (The fourth lens group G4 is not an element of the imaging-optical system).

TABLE 1

SURFACE DATA

| Surf. No. | r | d | N(d) | vd |
|---|---|---|---|---|
| 1 | −98.451 | 0.500 | 1.80420 | 46.5 |
| 2 | 5.410 | 0.750 | | |
| 3 | ∞ | 4.270 | 1.74400 | 44.9 |
| 4 | ∞ | 0.100 | | |
| 5* | −161.191 | 0.500 | 1.54358 | 55.7 |
| 6* | 4.317 | 0.180 | | |
| 7* | 4.266 | 1.170 | 1.60641 | 27.2 |
| 8* | 29.231 | d8 | | |
| 9 (Diaphragm) | ∞ | 0.000 | | |
| 10* | 3.644 | 2.000 | 1.49710 | 81.6 |
| 11* | −4.880 | 0.680 | | |
| 12* | 229.861 | 0.600 | 1.60641 | 27.2 |
| 13* | 3.973 | d13 | | |
| 14* | 18.616 | 1.040 | 1.54358 | 55.7 |
| 15* | −48.041 | d15 | | |
| 16 | ∞ | 4.000 | 1.74400 | 44.9 |
| 17 | ∞ | 0.200 | | |
| 18 | ∞ | 0.445 | 1.51680 | 64.2 |
| 19 | ∞ | — | | |

The asterisk (*) designates an aspherical surface which is rotationally symmetrical with respect to the optical axis.

TABLE 2

VARIOUS LENS SYSTEM DATA
Zoom Ratio 2.84

| | Wide-Angle Extremity | Intermediate Position | Telephoto Extremity |
|---|---|---|---|
| FNO. | 3.6 | 4.7 | 6.2 |
| f | 3.70 | 6.20 | 10.50 |
| W | 46.7 | 26.8 | 15.5 |
| Y | 2.86 | 2.86 | 2.86 |
| fB | 0.00 | 0.00 | 0.00 |
| Total lens length | 29.24 | 29.24 | 29.24 |
| d8 | 7.844 | 3.882 | 0.399 |
| d13 | 1.925 | 5.235 | 1.511 |
| d15 | 3.034 | 3.686 | 10.893 |

TABLE 3

Aspherical Surface Data (the aspherical surface coefficients not indicated are zero (0.00)):

| Surf. No. | K | A4 | A6 | A8 |
|---|---|---|---|---|
| 5 | 0.000 | −0.1220E−03 | 0.7494E−03 | −0.3556E−04 |
| 6 | 0.000 | −0.8900E−02 | 0.1065E−02 | 0.1783E−03 |
| 7 | 0.000 | −0.8024E−02 | −0.5216E−04 | 0.1562E−03 |
| 8 | 0.000 | −0.6410E−03 | −0.3196E−03 | 0.0000E+00 |
| 10 | 0.000 | −0.2452E−02 | −0.1878E−03 | −0.4828E−04 |
| 11 | 0.000 | 0.6138E−02 | −0.9375E−03 | 0.4318E−04 |
| 12 | 0.000 | 0.1290E−02 | −0.9876E−04 | −0.1281E−04 |
| 13 | 0.000 | −0.1409E−03 | 0.1214E−02 | −0.9921E−04 |
| 14 | 0.000 | −0.1135E−03 | −0.1085E−03 | 0.1058E−04 |
| 15 | 0.000 | −0.3201E−03 | −0.1047E−03 | 0.6830E−05 |

TABLE 4

LENS GROUP DATA

| Lens Group | 1st Surf. | Focal Length |
|---|---|---|
| G1 | 1 | −6.12 |
| G2 | 10 | 7.57 |
| G3 | 14 | 24.82 |
| G4 | 16 | ∞ |

TABLE 5

DATA RELATED TO CONDITIONS
OF THE PRESENT INVENTION

A = 1.678321
B = 1.333333
Lm = 4.645
V = 1.71360
H = 2.28
DexpW = 3.129778
DexpT = 2.995574
Y = 1.25
X = 1.92

Numerical Embodiment 2

Figures 13, 14A, 14B, 14C, 14D:
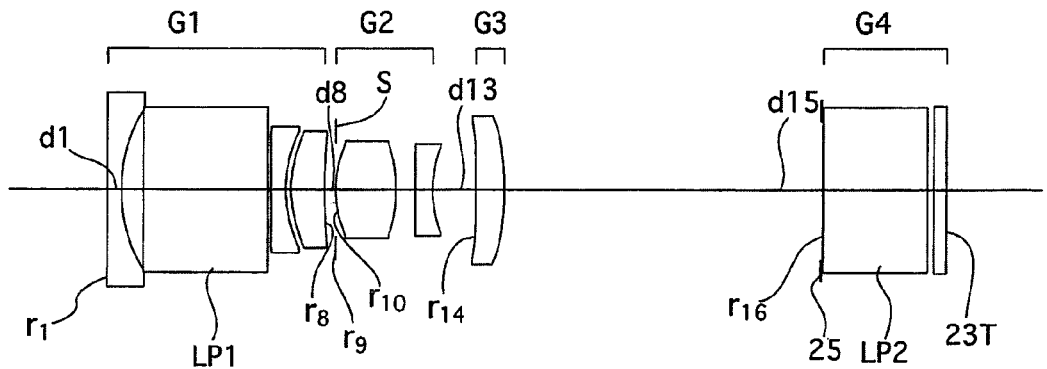
FIG. 13 shows a lens arrangement of the second numerical embodiment of the imaging device, according to the present invention, at the long focal length extremity.
FIGS. 14A, 14B, 14C and 14D show various aberrations that occurred in the lens arrangement shown in FIG. 13.

FIGS. 11 through 14D and Tables 6 through 10 show a second numerical embodiment of the imaging device (including a zoom lens system) of the present invention. FIG. 11 shows a lens arrangement of the second numerical embodiment of the imaging device at the wide-angle (short focal length) extremity when focused on an object at infinity. FIGS. 12A, 12B, 12C and 12D show various aberrations that occurred in the lens arrangement shown in FIG. 11. FIG. 13 shows a lens arrangement of the second numerical embodiment of an imaging device at the telephoto (long focal length) extremity when focused on an object at infinity. FIGS. 14A, 14B, 14C and 14D show various aberrations that occurred in the lens arrangement shown in FIG. 13.

Table 6 shows the lens surface data, Table 7 shows various lens system data, Table 8 shows the aspherical surface data, Table 9 shows lens group data and Table 10 shows data which is related to conditions of the present invention. The fundamental lens arrangement of the second numerical embodiment is same as that of the first numerical embodiment. The image height data Y at the wide-angle extremity, shown in Table 7, has been determined at 90% image height, in consideration of distortion correction.

TABLE 6

SURFACE DATA

| Surf. No. | r | d | N(d) | vd |
|---|---|---|---|---|
| 1 | ∞ | 0.500 | 1.77250 | 49.6 |
| 2 | 5.410 | 0.750 | | |
| 3 | ∞ | 4.270 | 1.74400 | 44.9 |
| 4 | ∞ | 0.100 | | |
| 5* | −120.000 | 0.500 | 1.54358 | 55.7 |
| 6* | 4.100 | 0.180 | | |
| 7* | 3.940 | 1.150 | 1.60641 | 27.2 |
| 8* | 17.720 | d8 | | |
| 9 (Diaphragm) | ∞ | 0.000 | | |
| 10* | 3.620 | 2.100 | 1.49710 | 81.6 |
| 11* | −4.600 | 0.670 | | |
| 12* | −120.00 | 0.600 | 1.60641 | 27.2 |
| 13* | 4.160 | d13 | | |
| 14* | −240.000 | 1.000 | 1.54358 | 55.7 |
| 15* | −12.280 | d15 | | |
| 16 | ∞ | 3.600 | 1.74400 | 44.9 |
| 17 | ∞ | 0.200 | | |
| 18 | ∞ | 0.445 | 1.51680 | 64.2 |
| 19 | ∞ | — | | |

The asterisk (*) designates an aspherical surface which is rotationally symmetrical with respect to the optical axis.

TABLE 7

VARIOUS LENS SYSTEM DATA
Zoom Ratio 2.84

| | Wide-Angle Extremity | Intermediate Position | Telephoto Extremity |
|---|---|---|---|
| FNO. | 3.5 | 4.7 | 6.0 |
| f | 3.70 | 6.20 | 10.50 |
| W | 41.6 | 26.8 | 15.5 |
| Y | 2.57 | 2.86 | 2.86 |
| FB | 0.00 | 0.00 | 0.00 |
| Total lens length | 28.83 | 28.83 | 28.83 |
| d8 | 7.733 | 3.917 | 0.399 |
| d13 | 2.000 | 5.428 | 1.491 |
| d15 | 3.036 | 3.425 | 10.880 |

TABLE 8

Aspherical Surface Data (the aspherical surface coefficients not indicated are zero (0.00)):

| Surf. No. | K | A4 | A6 | A8 |
|---|---|---|---|---|
| 5 | 0.000 | 0.5741E−03 | 0.1283E−03 | 0.6700E−06 |
| 6 | 0.000 | −0.9270E−02 | 0.1614E−02 | −0.7900E−04 |
| 7 | 0.000 | −0.9480E−02 | 0.1117E−02 | −0.6940E−04 |
| 8 | 0.000 | −0.9500E−03 | −0.5140E−04 | 0.0000E+00 |
| 10 | 0.000 | −0.2507E−02 | −0.1940E−03 | −0.1063E−03 |
| 11 | 0.000 | 0.6909E−02 | −0.1657E−02 | 0.8580E−04 |
| 12 | 0.000 | 0.1667E−02 | −0.2288E−02 | 0.3980E−03 |
| 13 | 0.000 | 0.8500E−04 | −0.4785E−03 | 0.3152E−03 |
| 14 | 0.000 | −0.1305E−02 | −0.3332E−03 | 0.5710E−05 |
| 15 | 0.000 | −0.1460E−02 | −0.2502E−03 | −0.3000E−05 |

TABLE 9

LENS GROUP DATA

| Lens Group | 1$^{st}$ Surf. | Focal Length |
|---|---|---|
| G1 | 1 | −6.09 |
| G2 | 10 | 7.27 |
| G3 | 14 | 23.77 |
| G4 | 16 | ∞ |

TABLE 10

DATA RELATED TO CONDITIONS
OF THE PRESENT INVENTION

A = 2.5
B = 1.333139
Lm = 4.245
V = 1.71360
H = 2.28
DexpW = 3.242148
DexpT = 3.078254
Y = 1.4
X = 3.5

Numerical Embodiment 3

FIGS. 15 through 18D and Tables 11 through 15 show a third numerical embodiment of the imaging device (including a zoom lens system) of the present invention. FIG. 15 shows a lens arrangement of the third numerical embodiment of the imaging device at the wide-angle (short focal length) extremity when focused on an object at infinity. FIGS. 16A, 16B, 16C and 16D show various aberrations that occurred in the lens arrangement shown in FIG. 15. FIG. 17 shows a lens arrangement of the third numerical embodiment of an imaging device at the telephoto (long focal length) extremity when focused on an object at infinity. FIGS. 18A, 18B, 18C and 18D show various aberrations that occurred in the lens arrangement shown in FIG. 17.

Table 11 shows the lens surface data, Table 12 shows various lens system data, Table 13 shows the aspherical surface data, Table 14 shows lens group data and Table 15 shows data which is related to conditions of the present invention. The fundamental lens arrangement of the third numerical embodiment is same as that of the first numerical embodiment. The image height data Y at the wide-angle extremity, shown in Table 7, has been determined at 90% image height, in consideration of distortion correction.

TABLE 11

SURFACE DATA

| Surf. No. | r | d | N(d) | νd |
|---|---|---|---|---|
| 1 | ∞ | 0.500 | 1.58913 | 61.2 |
| 2* | 4.323 | 1.113 | | |
| 3 | ∞ | 4.871 | 1.74400 | 44.9 |
| 4 | ∞ | 0.192 | | |
| 5* | −56.670 | 0.500 | 1.54358 | 55.7 |
| 6 | 4.381 | 0.125 | | |
| 7 | 4.534 | 1.178 | 1.60641 | 27.2 |
| 8* | 17.866 | d8 | | |
| 9 (Diaphragm) | ∞ | 0.000 | | |
| 10* | 3.310 | 2.241 | 1.49700 | 81.6 |
| 11* | −4.727 | 0.428 | | |
| 12* | 21.963 | 0.629 | 1.60641 | 27.2 |
| 13* | 3.585 | d13 | | |
| 14* | ∞ | 1.045 | 1.54358 | 55.7 |
| 15* | −10.679 | d15 | | |
| 16 | ∞ | 4.423 | 1.74400 | 4.9 |
| 17 | ∞ | 0.200 | | |
| 18 | ∞ | 0.445 | 1.51680 | 64.2 |
| 19 | ∞ | — | | |

The asterisk (*) designates an aspherical surface which is rotationally symmetrical with respect to the optical axis.

TABLE 12

VARIOUS LENS SYSTEM DATA
Zoom Ratio 2.98

| | Wide-Angle Extremity | Intermediate Position | Telephoto Extremity |
|---|---|---|---|
| FNO. | 3.5 | 4.9 | 6.1 |
| F | 2.87 | 5.10 | 8.55 |
| W | 48.0 | 27.7 | 16.8 |
| Y | 2.57 | 2.57 | 2.57 |
| fB | 0.00 | 0.00 | 0.00 |
| Total lens length | 28.14 | 28.15 | 28.15 |
| d8 | 7.219 | 3.408 | 0.130 |
| d13 | 0.840 | 4.843 | 2.125 |
| d15 | 2.195 | 2.005 | 8.000 |

TABLE 13

Aspherical Surface Data (the aspherical surface coefficients not indicated are zero (0.00)):

| Surf. No. | K | A4 | A6 | A8 |
|---|---|---|---|---|
| 2 | 0.000 | −0.2718E−02 | −0.1390E−04 | −0.5571E−05 |
| 5 | 0.000 | −0.5773E−02 | 0.1733E−03 | 0.0000E+00 |
| 8 | 0.000 | −0.3416E−02 | 0.2289E−03 | 0.0000E+00 |
| 10 | 0.000 | −0.3141E−02 | −0.2935E−03 | −0.2615E−03 |
| 11 | 0.000 | 0.7032E−02 | −0.4106E−02 | 0.2001E−03 |
| 12 | 0.000 | 0.6200E−03 | −0.5829E−02 | 0.3015E−03 |

TABLE 13-continued

Aspherical Surface Data (the aspherical surface coefficients not indicated are zero (0.00)):

| Surf. No. | K | A4 | A6 | A8 |
|---|---|---|---|---|
| 13 | 0.000 | 0.4550E−03 | −0.2585E−02 | 0.3486E−03 |
| 14 | 0.000 | −0.5996E−03 | −0.1856E−03 | −0.3835E−04 |
| 15 | 0.000 | −0.6259E−03 | −0.1493E−03 | −0.3316E−04 |

TABLE 14

LENS GROUP DATA

| Lens Group | 1$^{st}$ Surf. | Focal Length |
|---|---|---|
| G1 | 1 | −5.29 |
| G2 | 10 | 6.55 |
| G3 | 14 | 19.65 |
| G4 | 16 | 00 |

TABLE 15

DATA RELATED TO CONDITIONS
OF THE PRESENT INVENTION

A = 1.483157
B = 1.333333
Lm = 5.068
V = 1.71360
H = 2.28
DexpW = 2.670798
DexpT = 2.820012
Y = 1.29
X = 1.91

The numerical values of each condition for each embodiment are shown in Table 16.

TABLE 16

| | Embod. 1 | Embod. 2 | Embod. 3 |
|---|---|---|---|
| Cond. (1) | 0.794 | 0.533 | 0.899 |
| Cond. (2) | 2.711 | 2.477 | 2.958 |
| Cond. (3) | 0.066 | 0.070 | 0.100 |
| Cond. (4) | 0.729 | 0.817 | 0.753 |

As can be understood from Table 16, the first through third embodiments satisfy conditions (1) through (4). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device comprising:
an imaging sensor having a rectangular imaging surface;
an image-forming optical system which forms an object image onto said rectangular imaging surface;
a prism disposed between said image-forming optical system and said imaging sensor, said prism bending the optical path of said image-forming optical system; and
a mask provided with a rectangular opening which limits light that is to be incident on said imaging sensor, wherein the aspect ratio of said rectangular opening of said mask is larger than the aspect ratio of said rectangular imaging surface of said imaging sensor; and wherein said mask is disposed at a position at which a peripheral light quantity difference between the short side and the long side of said rectangular imaging surface of said imaging sensor is smaller than in a case where the aspect ratio of said rectangular opening of said mask is equal to the aspect ratio of said rectangular imaging surface of said imaging sensor.

2. The imaging device according to claim 1, wherein the following condition (1) is satisfied:

$$0.5<B/A<0.9, \quad (1)$$

wherein

A designates the aspect ratio of said rectangular opening of said mask, and

B designates the aspect ratio of said rectangular imaging surface of said imaging sensor.

3. The imaging device according to claim 1, wherein said mask is disposed at a position which is closer to the object side than a position of said prism.

4. The imaging device according to claim 1, wherein the following condition (2) is satisfied:

$$1.0<Lm/V<3.0, \quad (2)$$

wherein

Lm designates the distance from said imaging surface of said imaging sensor to said opening of said mask, and V designates the length of said short side of said imaging surface of said imaging sensor.

5. The imaging device according to claim 1, wherein said image-forming optical system comprises a zoom optical system, and wherein the following condition (3) is satisfied:

$$Lm \cdot |(1/DexpW)-(1/DexpT)|<0.3, \quad (3)$$

wherein

DexpW designates the exit pupil diameter at the shortest focal length extremity of said zoom optical system, and DexpT designates the exit pupil diameter at the longest focal length extremity of said zoom optical system.

6. The imaging device according to claim 1, wherein the following condition (4) is satisfied:

$$0.6<Y/V<1.0, \quad (4)$$

wherein

Y designates the length of the short side of said opening of said mask, and

V designates the length of the short side of said imaging surface of said imaging sensor.

7. The imaging device according to claim 1, wherein said image-forming optical system comprises a negative first lens group having an incident-side prism, a positive second lens group and a positive third lens group, arranged in that order from the object side, and wherein, during zooming, said first lens group is stationary, and said second and third lens groups move in the optical axis direction.

8. The imaging device according to claim 1, wherein said mask is provided on an incident surface of said prism which is disposed between said image-forming optical system and said imaging sensor.

* * * * *